Figure 1:
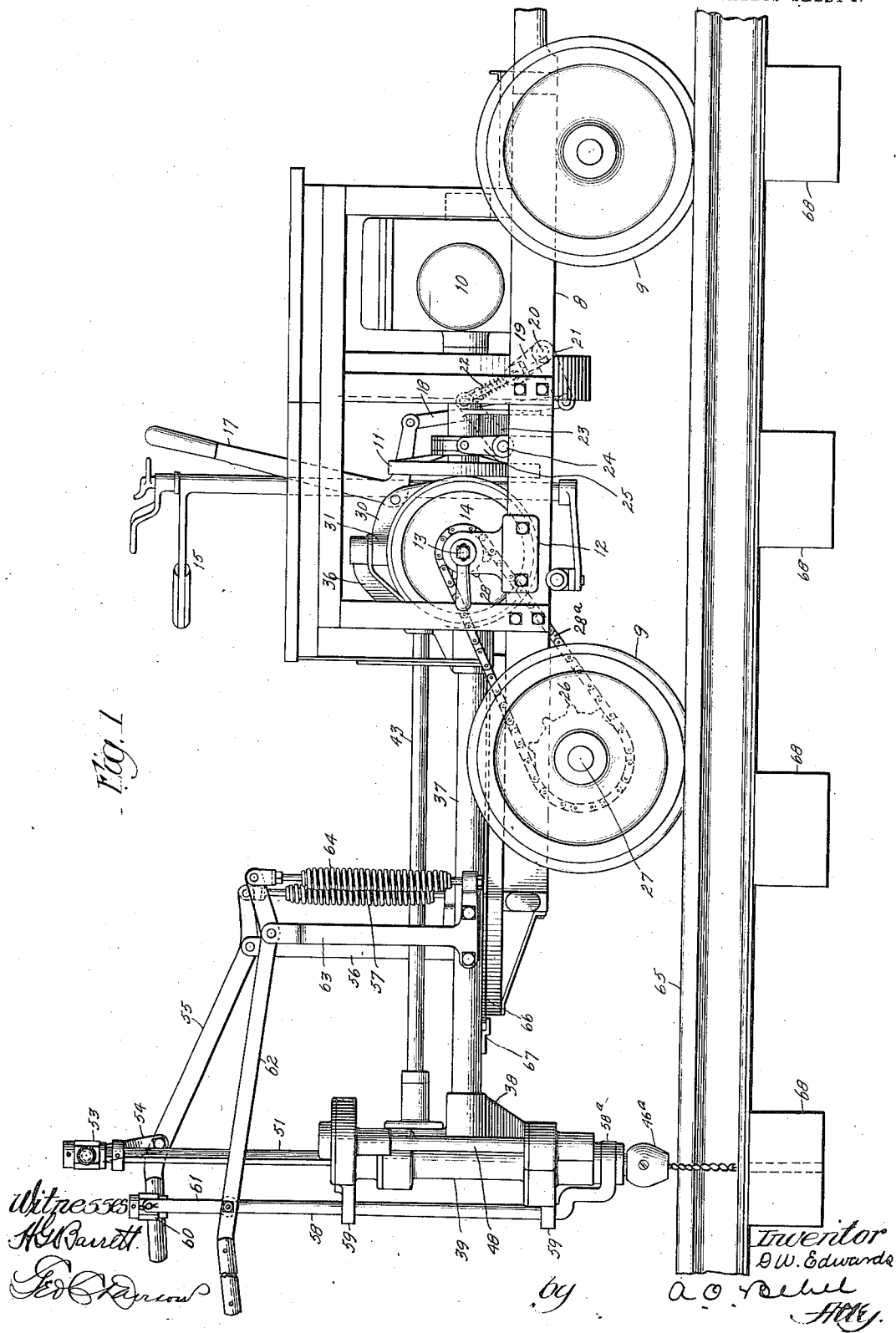

D. W. EDWARDS.
BORING AND SCREW DRIVING MACHINE.
APPLICATION FILED OCT. 30, 1911.

1,060,173.

Patented Apr. 29, 1913.

3 SHEETS—SHEET 1.

Witnesses
H. G. Barrett
Geo. C. Farrow

Inventor
D. W. Edwards
by A. C. Bebee
Atty.

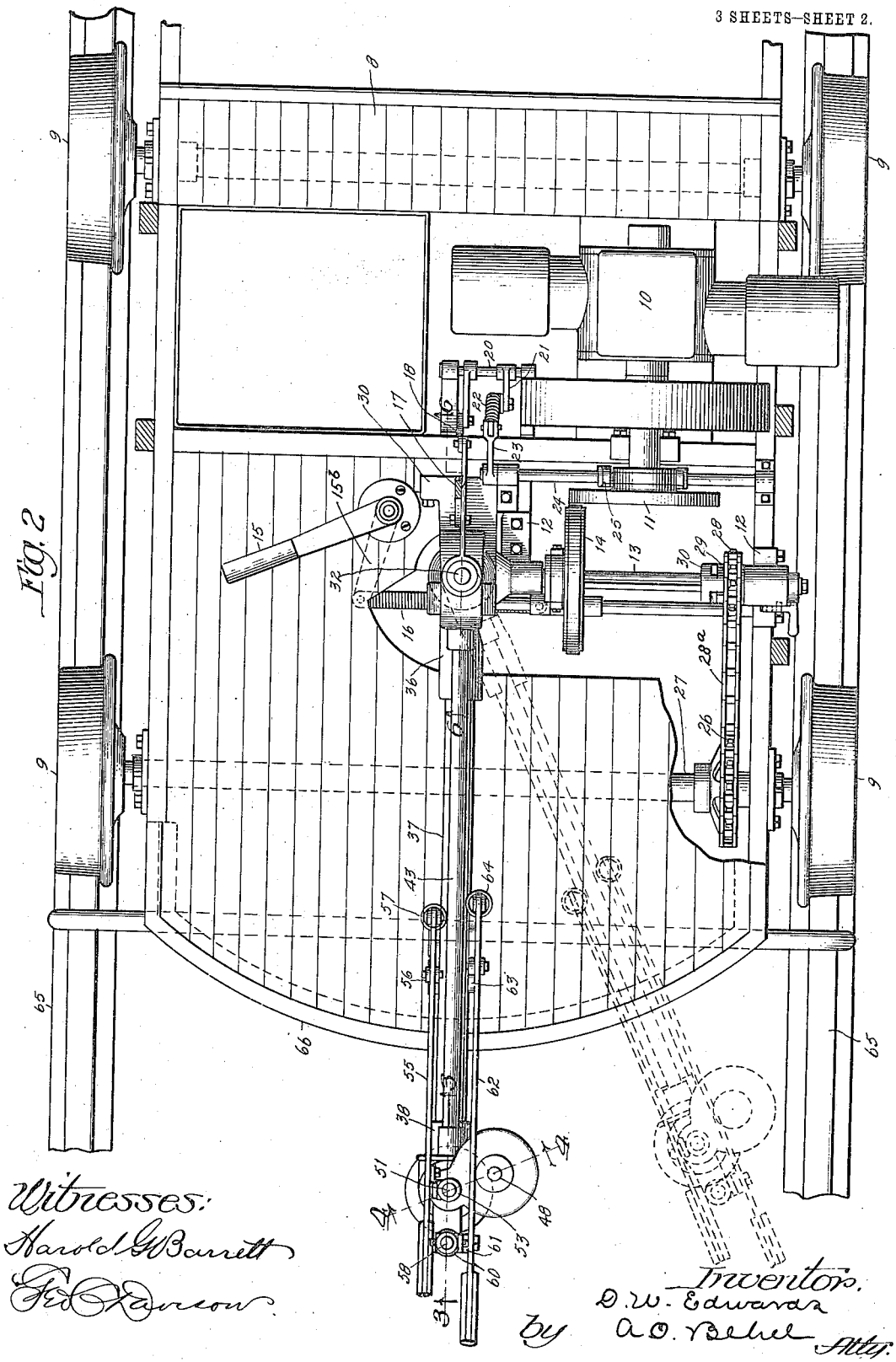

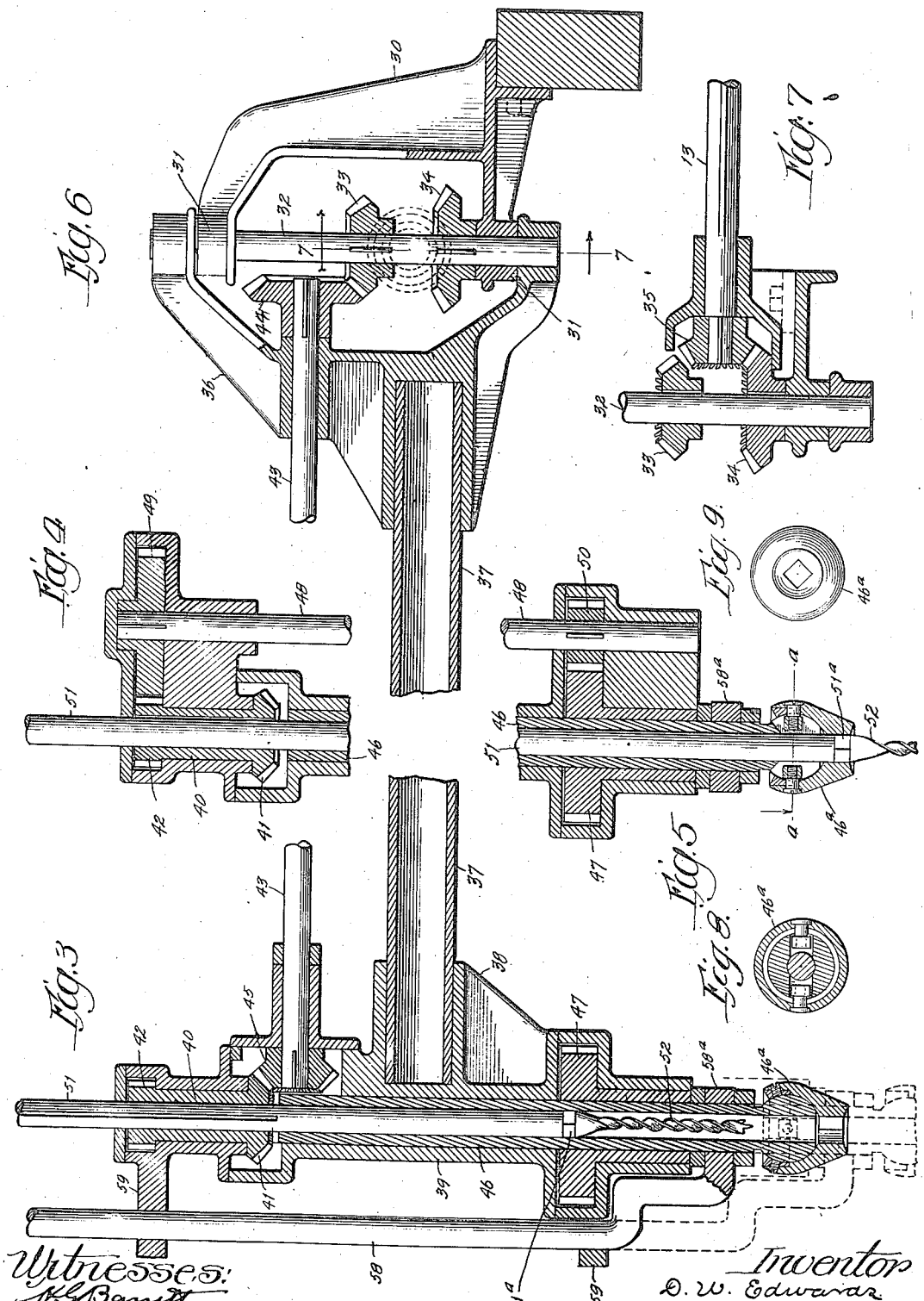

UNITED STATES PATENT OFFICE.

DANIEL W. EDWARDS, OF ROCKFORD, ILLINOIS, ASSIGNOR TO GREENLEE BROS. & COMPANY, OF ROCKFORD, ILLINOIS, A CORPORATION OF ILLINOIS.

BORING AND SCREW-DRIVING MACHINE.

1,060,173.  Specification of Letters Patent.  Patented Apr. 29, 1913.

Application filed October 30, 1911. Serial No. 657,674.

*To all whom it may concern:*

Be it known that I, DANIEL W. EDWARDS, a citizen of the United States, residing at Rockford, in the county of Winnebago and State of Illinois, have invented certain new and useful Improvements in Boring and Screw-Driving Machines, of which the following is a specification.

The primary object of this invention is to provide mechanism of a novel, simple and thoroughly practical character for forming holes and introducing into such holes certain predetermined articles. Thus in a specific aspect, the mechanism is particularly intended for producing holes in railway ties, and inserting into such holes, rail-fastening elements, as for example, screw spikes.

In the accompanying drawings, Figure 1 is a side elevation of a car and my improvements supported thereby. Fig. 2 is a plan view. Fig. 3 is a section on line 3—3, Fig. 2. Fig. 4 is a section on line 4—4 of Fig. 2, showing the upper portion. Fig. 5 is a section on line 4—4, Fig. 2, showing the lower portion. Fig. 6 is a section on line 6—6, Fig. 2. Fig. 7 is a section on line 7—7, Fig. 6. Fig. 8 is a section on line a—a, Fig. 5. Fig. 9 is a view looking at the face of the wrench socket as shown in Fig. 3.

Similar reference numerals designate corresponding parts in all the figures of the drawings.

In the embodiment disclosed, a car is provided, comprising a platform 8 supported on wheels 9. Mounted on this car, is a suitable motor, shown in the form of an internal combustion engine 10. A friction disk 11 is operated by this motor.

Bearings 12 are mounted on the platform, and journaled in these bearings, is a transversely disposed shaft 13, on which is feathered a friction wheel 14. A handle 15 is fixed to the upper end of a vertical rock shaft 15ª that is journaled on the platform contiguous to one end of the shaft 13, and the lower end of this rock shaft is provided with a crank arm 15ᵇ connected to a link 16. This link is also connected to a sliding head 16ª carrying a yoke 16ᵇ engaged with the hub of the friction wheel 14. It will be therefore evident that by turning the handle 15, the friction wheel 14 may be moved along the shaft 13, and its periphery engaged with the face of the friction disk 11 at different distances from its axis of rotation. In order to insure a proper frictional contact between the friction disk and friction wheel, a lever 17 is provided, which has a link connection 18 with a crank arm 19 carried by a shaft 20. The shaft 20 is provided with another crank arm 21 having a yielding connection 22 with a third crank arm 23. The crank arm 23 is carried by a rock shaft 24 that also carries a yoke 25 engaged with the hub of the friction disk, thus providing means, whereby the friction disk may be moved against the periphery of the friction wheel, or moved out of engagement therewith.

A sprocket wheel 26 is secured to one of the car axles 27, and another sprocket wheel 28 is loosely mounted on the shaft 13. A chain 28ª connects the two sprocket wheels. The sprocket wheel 28 is provided with a clutch face 29, and a clutch section 30, slidably mounted on the shaft 13, is movable into and out of coaction with the clutch face 29. By thus moving the clutch section into and out of engagement with the clutch face 29, it will be evident that the car may be propelled by the motor, or can be brought to a standstill, without the necessity of stopping the motor.

Mounted on the car platform, is a bracket 30, provided with upper and lower bearings 31, in which is journaled a vertical shaft 32 having two bevel gear wheels 33 and 34 secured thereto. A bevel gear wheel 35, carried by the shaft 13, meshes with the bevel gear 34, and thus transmits motion to the shaft 32. A yoke 36 has its arms journaled on the shaft 32, respectively above and below the bearings 31 of the bracket 30, said shaft thus constituting a pivot mounting for the bracket, and rigidly secured to this yoke 36 is a tubular supporting arm 37 having fixed to its outer end, a head 38 having a vertical tubular section 39. In the upper portion of this tubular section is journaled a tubular shaft 40 having a bevel gear 41 at its lower end and a spur gear 42 at its upper end. A power-transmitting shaft 43, shown in the present instance, above and parallel to the arm 37, is journaled in the yoke 36, and the head 38. The rear end of this shaft 43 carries a bevel gear 44 that meshes with the bevel gear 33. The opposite end carries a bevel gear 45 that is in mesh with the bevel gear 41.

A tubular tool-supporting sleeve or shaft 46 is journaled in the tubular section, 39 of the head 38, and is capable of both rotary and reciprocatory movement therein. To the lower portion of this tubular shaft or sleeve 46 is splined a spur gear 47 and a vertical shaft 48, located alongside the sleeve 46 and journaled in the head 38, has at its upper end a spur gear 49 meshing with the spur gear 42, and at its lower end, a spur gear 50 meshing with the spur gear 47.

Journaled within the tubular tool-holding shaft or sleeve 46 is a rotary and vertically reciprocatory spindle 51 splined to the tubular shaft 40. The lower end of this spindle 51, is provided with a suitable chuck 51ª, by means of which a hole-forming tool, such as a drill or boring bit 52 may be attached to said spindle.

The upper end of the spindle 51 is rotatably mounted in a collar 53, to which is pivoted a link 54 that is also pivoted to a hand lever 55. The lever 55 is fulcrumed on a standard 56 suitably secured to the supporting arm 37, and a spring 57, connected to one end of said lever, normally holds the spindle 51 in elevated position. A vertically reciprocatory rod 58, slidably mounted in guide ears 59, formed on the head, has its lower end offset and formed into a collar 58ª that surrounds the lower end of the tool-holding shaft or sleeve 46. A collar 60 is mounted on the upper end of the rod 58, and a link 61, pivoted to said collar, is also pivoted to a second hand lever 62 fulcrumed upon a second standard 63, suitably secured to the supporting arm 37. A spring 64, secured to the lever 62, serves to also hold this lever, and consequently the tool-carrying shaft or sleeve 46 in elevated position. The lower end of the sleeve or tubular shaft 46 has a suitable inserting tool mounted thereon. This tool, in the present embodiment, is shown in the form of a socket element 46ª that is loosely jointed to the tubular shaft 46 so as to be capable of a slight oscillatory movement thereon, while being rotated thereby.

It will be evident that the supporting arm 37 and the mechanism carried thereby, is capable of a swinging movement transversely of the front end of the car platform, and in order to guide it in its movement and insure the proper vertical relation of the parts at all times, the front end of said platform is curved and provided with a flanged track 66 engaged by a keeper or clip 67 secured to the underside of the supporting arm 37.

Briefly described, the operation of the machine is as follows: The same is mounted on a car track, as illustrated, and the motor being in operation, it may be propelled along said track by engaging the clutch section 30 with the clutch face 29, any suitable or well known mechanism (not shown) being employed for operating the clutch section 30. To stop the car, it is only necessary to disengage the clutch section 30 from the clutch face 29. The supporting arm 37 is swung to one side or the other of the track until the head is properly positioned over a tie. The lever 55 is thereupon depressed, thereby moving the spindle with the hole-forming tool 52, downwardly and drilling or boring the hole, as indicated in Fig. 1. When said hole has been formed, the lever 55 is released, whereupon the spring 57 will react and elevate the same. The article to be inserted in the hole is then placed therein, and the lever 62 is forced down against the action of the spring 54. This will cause the rotating tool-inserting member to be brought down upon the article, as for example, a screw spike and the same will be driven home. The mechanism can then be swung to the other side of the track, and the operation repeated. To unscrew the devices from their holes, it is only necessary to reverse the direction of rotation of the tool-holding sleeve or shaft. The entire mechanism can be stopped at any time without stopping the engine by disengaging the friction disk from the friction wheel.

In this mechanism, it is desired to call particular attention to two features. In the first place, it will be noted that both the hole-forming and article-inserting devices are at all times maintained in perpendicular relation to the surface of the track, so that the holes will always be properly formed, insuring the proper positioning of the articles. This is exceedingly important. Moreover, the structure is very simple, and both the hole-forming device and the article-engaging and inserting means operate on coincident axes of rotation and the spike or article is bound to be driven in exactly the sae line as the hole is bored or formed.

From the foregoing, it is thought that the construction, operation and many advantages of the herein described invention will be apparent to those skilled in the art, and it will be understood that various changes in the size, shape, proportion and minor details of construction may be resorted to without departing from the spirit or scope of the invention.

Having thus fully described my invention, what I claim as new, and desire to secure by Letters Patent, is:—

1. In a boring and screw-driving machine, the combination of a frame, a support carried thereby and capable of a horizontal movement, rotary telescoping shafts journaled in the support, means for rotating the shafts, a drill or bit-holding means carried by the inner shaft, a socket member carried by the outer shaft, and levers connected to the respective shafts for reciprocating the same.

2. In a boring and screw-driving machine, the combination of a head capable of a horizontal movement, a sleeve journaled therein, a shaft carried within the sleeve, said sleeve and shaft being capable of a rotary and reciprocatory movement, hole forming means carried by the shaft, a socket member carried by the sleeve, means for rotating the sleeve and shaft, and means for reciprocating the same.

3. In a boring and screw-driving machine, the combination of a frame, a support carried thereby and capable of a horizontal movement, a head fixedly carried at the free end of said support, a pair of independently reciprocable shafts journaled in the head and telescoping therein, means for simultaneously rotating said shafts, means for securing a wrench head to one shaft, means for securing a boring tool to the other shaft, and means for independently reciprocating said shafts.

4. In a boring and screw-driving machine, the combination of a frame, a support carried thereby and capable of a horizontal movement, a head fixedly carried at the free end of said support, a pair of vertically longitudinally movable telescoping shafts journaled in the head, means for rotating said shafts, a drill holding chuck carried by the lower end of the inner shaft, a socket member carried by the lower end of the outer shaft, a lever connected to the upper end of the inner shaft for moving the same longitudinally, and a lever connected to the lower end of the outer shaft for moving the same longitudinally.

5. In a boring and screw-driving machine, the combination of a frame, a movable support carried thereby, a tubular head carried by the support, a reciprocatory sleeve journaled therein, a reciprocatory shaft within said sleeve, means for rotating the sleeve and shaft, boring means secured to the lower end of the shaft, a socket member secured to the lower end of the sleeve, and means for independently reciprocating the sleeve and shaft lengthwise of the head.

6. A boring and screw-driving machine, comprising, a frame, a movable head, a pair of telescoping shafts journaled therein and capable of rotary and reciprocatory movement, boring means secured to the lower end of the inner shaft, a socket member secured to the lower end of the outer shaft, means for rotating the shafts each at a different rate of speed, and means for independently reciprocating the shafts lengthwise of the head.

7. A boring and screw-driving machine comprising, a frame, a movable head, a reciprocable sleeve journaled in the head, a reciprocable shaft within said sleeve, driving means for rotating the sleeve and shaft independently, boring means secured to the lower end of the shaft, a socket member secured to the lower end of the sleeve, and means for independently reciprocating the shaft and sleeve lengthwise of the head.

8. A boring and screw-driving machine comprising, a frame, a movable head, a reciprocatory sleeve journaled in the head, a reciprocable shaft within the sleeve, means for rotating the shaft, an auxiliary shaft having a driving connection between the sleeve and first mentioned shaft and adapted to impart rotary motion to said sleeve, boring means secured to the lower end of the shaft, a socket member secured to the lower end of the sleeve, and means for independently reciprocating the shaft and sleeve.

9. A boring and screw-driving machine comprising, a frame, a movable head, a reciprocatory sleeve journaled in the head, a reciprocatory shaft within said sleeve, driving means for rotating the sleeve and shaft, boring means secured to the lower end of the shaft, a socket member secured to the lower end of the sleeve and universally movable thereon, and means for independently reciprocating the shaft and sleeve.

10. A boring and screw-driving machine, comprising, a frame, a movable housing carried by the frame, a rotary sliding sleeve and socket journaled in the housing, a rotary sliding shaft having a bit chuck and being incased in the sleeve, the sleeve and shaft being adapted to operate concentrically, the shaft adapted to vertically telescope within the sleeve and the sleeve to telescope within the housing, and levers for independently reciprocating the sleeve and shaft.

In testimony whereof I have hereunto set my hand in presence of two subscribing witnesses.

DANIEL W. EDWARDS.

Witnesses:
GEORGE C. PURDY,
A. M. DORAN.